United States Patent [19] [11] Patent Number: 4,871,190
Willey [45] Date of Patent: Oct. 3, 1989

[54] SAFETY APPARATUS
[75] Inventor: Ronald A. Willey, Port Huron, Mich.
[73] Assignee: TRW Vehicle Saftey Systems Inc., Lyndhurst, Ohio
[21] Appl. No.: 106,146
[22] Filed: Oct. 8, 1987
[51] Int. Cl.$^4$ .............................................. B60R 21/10
[52] U.S. Cl. ...................................... 280/801; 280/808; 297/468
[58] Field of Search ................ 280/801, 808; 297/468; 24/196, 69 SB, 309

[56] References Cited

U.S. PATENT DOCUMENTS

| | | | |
|---|---|---|---|
| 422,741 | 3/1890 | Dearborn | 24/309 |
| 3,888,541 | 6/1975 | Stephenson | 24/309 |
| 3,941,419 | 3/1976 | Blom | 280/808 |
| 3,974,546 | 8/1976 | Walker | 24/196 |
| 4,445,709 | 5/1984 | Bost | 280/801 |
| 4,480,854 | 11/1984 | Doty | 280/801 |
| 4,551,889 | 11/1985 | Narayan et al. | 24/196 |
| 4,588,207 | 5/1986 | Doty | 280/801 |

Primary Examiner—Kenneth R. Rice
Attorney, Agent, or Firm—Tarolli, Sundheim & Covell

[57] ABSTRACT

The present invention is a safety apparatus having a belt which restrains an occupant of a vehicle against movement relative to the vehicle. A tongue assembly is mounted on the belt and is connectable with a buckle to secure the belt across the lap and torso of the occupant of the vehicle. The tongue assembly includes a lock bar which is movable relative to a base of the tongue assembly between an engaged position in which the belt is clamped between the base and the lock bar and a release position in which the belt is freely movable relative to the tongue assembly. To facilitate movement of the belt relative to the tongue assembly, when the tongue assembly is disconnected from the buckle, the belt extends along a substantially linear path through the tongue assembly. This is accomplished in part by having the belt enter the tongue assembly through an opening adjacent to the base of the tongue assembly and in a direction generally parallel to the base.

11 Claims, 3 Drawing Sheets

U.S. Patent    Oct. 3, 1989    Sheet 1 of 3    4,871,190
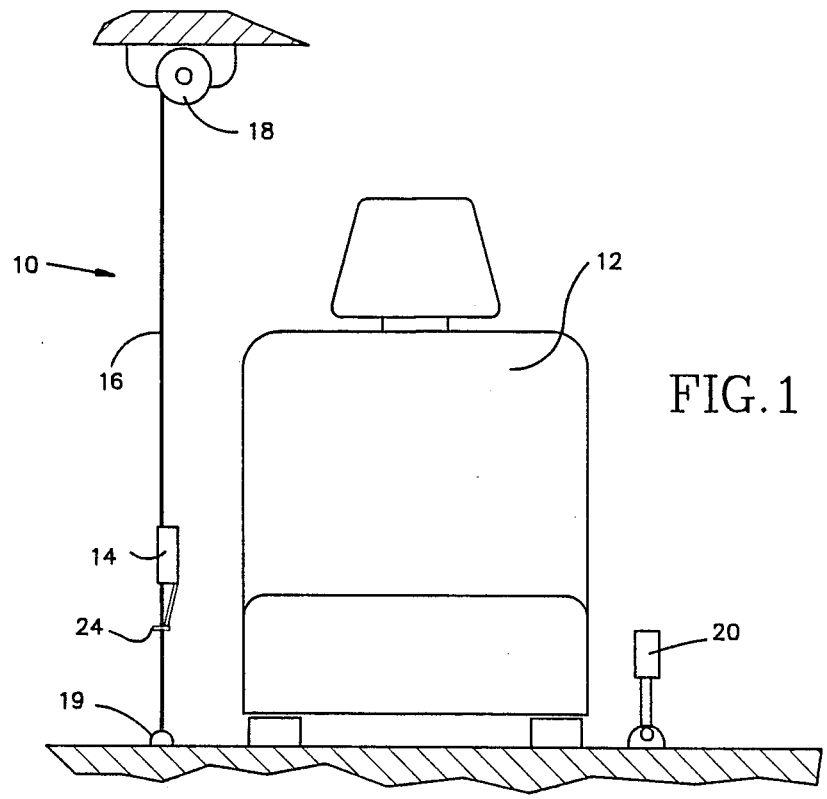
FIG. 1
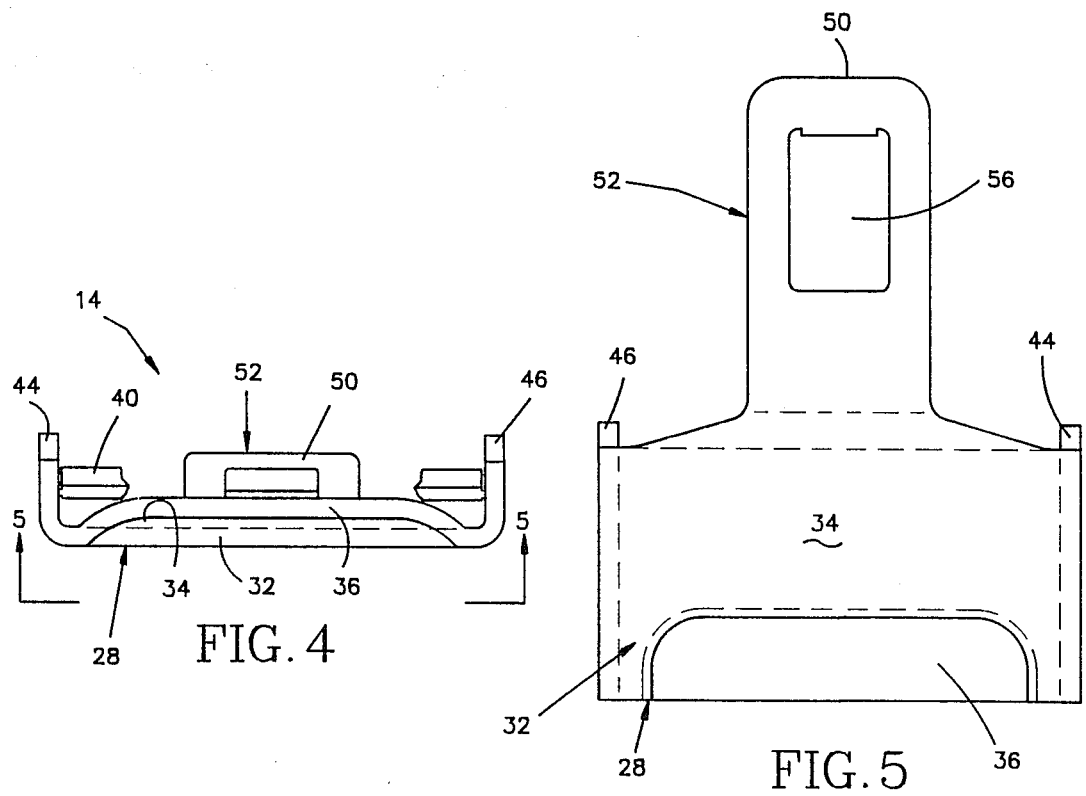
FIG. 4
FIG. 5

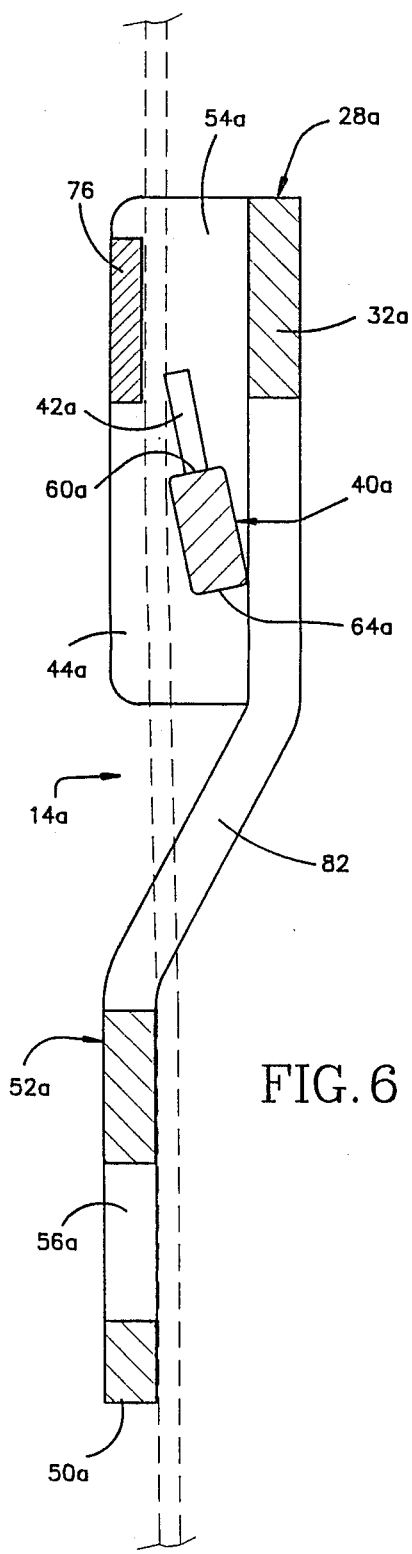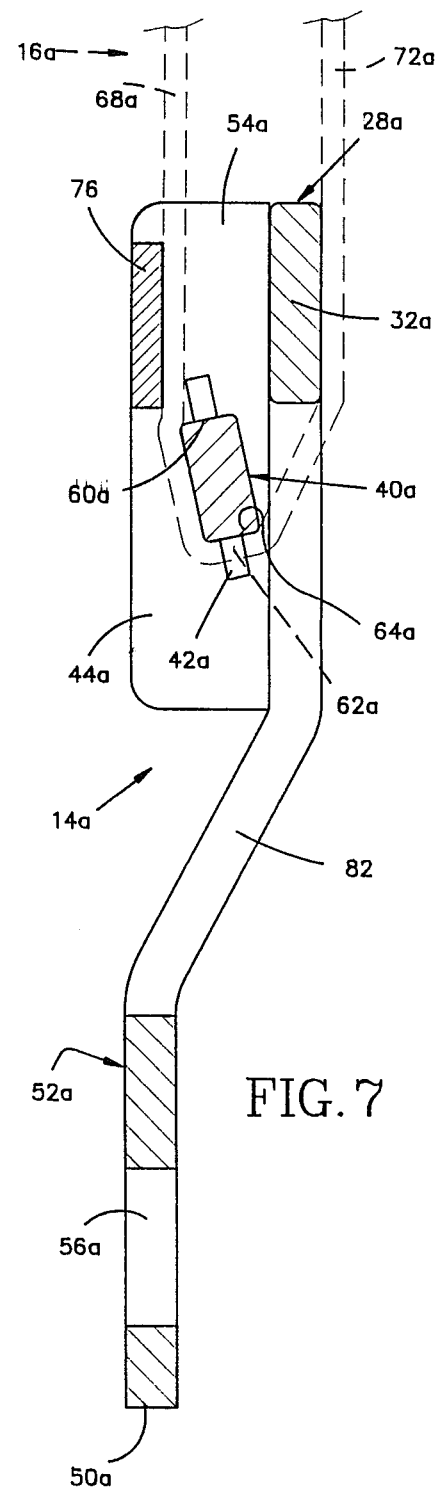

SAFETY APPARATUS

BACKGROUND OF THE INVENTION

1. Field of the Invention

The present invention relates to a safety apparatus for use in restraining an occupant of a vehicle against movement relative to the vehicle.

2. Prior Art

A known safety apparatus includes a safety belt upon which a tongue assembly is slidably mounted. When the safety belt is to be connected to restrain an occupant of a vehicle, the safety belt is withdrawn from a retractor and the tongue assembly is connected with a buckle. When the tongue assembly is released from the buckle, the belt is wound on the retractor. As the retractor winds the safety belt, both the belt and the tongue assembly are moved by the retractor.

Since both the safety belt and tongue assembly are moved by the retractor, the retractor must have a relatively strong wind up spring. The wind up spring must be capable of exerting enough force on the belt to move the combined weight of the belt and the tongue assembly. When the belt is in use, the relatively large force exerted by the retractor wind up spring results in the safety belt being pulled across the torso of an occupant of the vehicle with a force which some occupants may find to be objectionably large.

SUMMARY OF THE INVENTION

The present invention provides a safety apparatus having a belt which restrains an occupant of a vehicle against movement relative to the vehicle. A tongue assembly is mounted on the belt and is connectable with a buckle to secure the belt across the lap and torso of the occupant of the vehicle. The tongue assembly includes a lock bar which is movable relative to a base of the tongue assembly between an engaged position in which the belt is clamped between the base and the lock bar and a release position in which the belt is freely movable relative to the tongue assembly. When the tongue assembly is disconnected from the buckle, the belt extends along a substantially linear path through the tongue assembly to facilitate movement of the belt relative to the tongue assembly. This is accomplished by having the belt enter the tongue assembly through an opening adjacent to the base of the tongue assembly and in a direction generally parallel to the base.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat and an occupant restraint system embodying the present invention;

FIG. 4 is an end view, taken along the line 4—4 of FIG. 3, illustrating the configuration of a base structure used in the tongue assembly of FIG. 3 with components of the tongue assembly broken away for purposes of clarity of illustration;

FIG. 5 is a plan view, taken generally along the line 5—5 of FIG. 4, further illustrating the construction of the base structure;

FIG. 6 is a sectional view, generally similar to FIG. 2, of a second embodiment of the tongue assembly and illustrating the tongue assembly in an inactive position; and FIG. 7 is a sectional view, generally similar to FIG. 3, of the tongue assembly of FIG. 6 in an active position.

DESCRIPTION OF SPECIFIC PREFERRED EMBODIMENTS OF THE INVENTION

Figure 2:
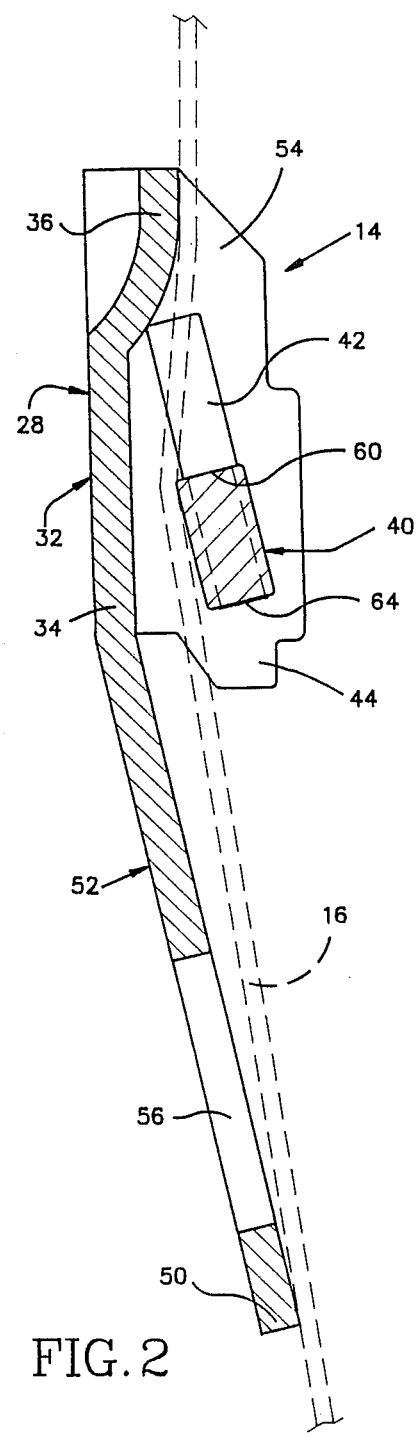
FIG. 2 is an enlarged sectional view of a tongue assembly used in the safety restraint system of FIG. 1, illustrating the tongue assembly in an inactive position.

A safety apparatus 10 for use in restraining an occupant of a vehicle against movement relative to the vehicle is illustrated schematically in FIG. 1. During operation of the vehicle, an occupant of a vehicle sits on a seat 12. The safety apparatus 10 is engaged to restrain the occupant against movement relative to the vehicle and the seat 12.

To engage the safety apparatus, a tongue assembly 14 is manually grasped and a safety belt 16 is pulled across the lap of the occupant sitting in the seat 12. As the tongue assembly 14 is pulled across the lap of the occupant of the seat 12, the tongue assembly moves along the safety belt 16. As this is occurring, the safety belt 16 is unwound from a retractor assembly 18 connected with the vehicle. An end of the safety belt 16 opposite the retractor 18 is secured to a stationary mounting 19 on the frame of the vehicle.

When the safety belt 16 has been pulled across the lap and torso of the occupant of the vehicle, the tongue assembly 14 is connected with a buckle 20. The buckle 20 is connected to the frame of the vehicle and is disposed on a side of the seat 12 opposite the stationary mounting 19. As the tongue assembly 14 is connected with the buckle 20, a portion 72 (FIG. 3) of the safety belt 16 is pulled tight across the lap of the occupant of the seat 12. At the same time, another portion 68 (FIG. 3) of the safety belt extends across the torso or chest of the occupant of the vehicle and is tensioned by the retractor assembly 18.

The force which the retractor assembly 18 exerts on the safety belt 16 must be sufficient to retract the belt 16 when the tongue assembly 14 is disconnected from the buckle. In order to minimize the force which the retractor assembly 18 must apply to the safety belt 16, the belt 16 can move freely relative to the tongue assembly 14. Therefore, the tongue assembly 14 can move downwardly along the belt 16 under the influence of gravity after the tongue assembly 14 has been disconnected from the buckle 20 and the retractor assembly 18 begins to rewind or retract the safety belt 16. Since the safety belt 16 can move freely relative to the tongue assembly 14, the force which the retractor assembly 18 applies to the safety belt to rewind the safety belt, does not have to be large enough to move both the safety belt 16 and the tongue assembly. Therefore, the retractor assembly 18 may use a relatively light wind-up spring. A suitable stop 24 may be provided on the safety belt 16 to limit downward movement of the tongue assembly 14 and to hold the tongue assembly in a position in which it is readily grasped by an occupant of the vehicle.

The tongue assembly 14 includes a base structure 28. The base structure 28 (FIG. 2) includes a base plate 32 having a flat main section 34. A hump or retaining section 36 is formed in the base plate 32. A straight lock bar 40 is movable along a slot 42 formed in a flange 44 which extends perpendicularly from the base plate 32. Although only a single flange 44 and lock bar slot 42 have been shown in FIGS. 2 and 3, it should be understood that there are a pair of flanges 44 and 46 (FIG. 4) which extend perpendicular to the main section 34 of the base plate 32 and support opposite ends of the lock bar 40. The flanges 44 and 46 and base plate 32 are formed as one piece by stamping a metal blank.

The slot 42 in which the lock bar 40 slides extends upwardly and outwardly away from the retaining section 36 of the base plate 32. Therefore, as the tongue assembly 14 moves along the safety belt 16 under the influence of gravity or as the safety belt is pulled upwardly through the tongue assembly by the retractor assembly, the friction force applied against the lock bar 40 by the safety belt 16 tends to pull the lock bar 40 upwardly to the released or disengaged position shown in FIG. 2.

When the lock bar 40 is in the released or disengaged position shown in FIG. 2, there is a minimum of friction between the tongue assembly 14 and the safety belt. This is because the safety belt extends in a substantially straight line through the tongue assembly 14 and engages the tongue assembly 14 at only three locations, that is at the hump or retaining section 36, at the lock bar 40 and at an outermost end portion 50 of a tongue plate 52. The safety belt 16 extends into the tongue assembly 14 through a rectangular opening 54 formed between the flanges 44 and 46 and the base plate 32. The portion of the safety belt 16 which extends through the opening 54 into the tongue assembly 14 lies generally parallel to the main section 34 of the base plate 32. Sliding motion between the tongue assembly 14 and the safety belt 16 is effective to apply a force against the lock bar 40 to hold the lock bar in the disengaged or released condition shown in FIG. 2 as the safety belt is wound on the retractor 18.

As noted above, when the tongue assembly 14 is to be connected with the buckle 20 (FIG. 1), the tongue assembly is manually pulled along the safety belt 16 and across the lap of an occupant of the vehicle. The tongue assembly 14 is then manually inserted into the buckle 20. As the tongue plate 52 is manually inserted into the buckle 20, a latch ember (not shown) in the buckle 20 moves into an opening 56 in the tongue plate 52 to hold the tongue assembly 14 against movement relative to the buckle 20 in a known manner.

Figure 3:
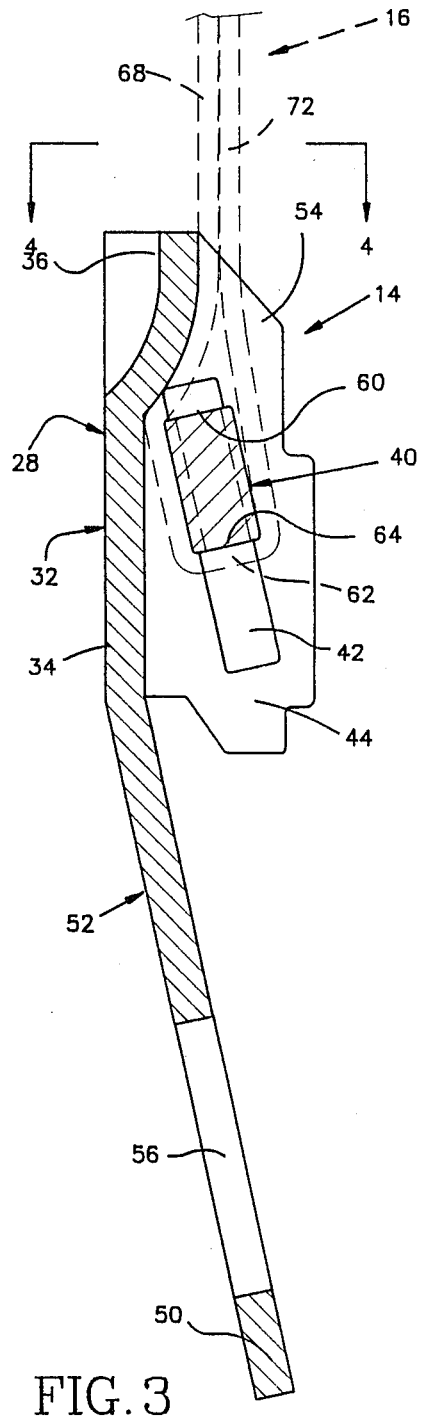
FIG. 3 is a sectional view, generally similar to FIG. 2, illustrating the tongue assembly in an active position.

When the tongue assembly 14 is engaged by the buckle and the portion 72 of the belt is tensioned, the latch bar 40 is moved by the belt in the flange slot 42 toward the hump or retaining section 36 to clamp the safety belt 16 between an edge or corner portion 60 of the latch bar 40 and the retaining section 36 of the base plate 32 (FIG. 3). At this time, a safety belt portion 62 extends around an edge portion 64 of the lock bar 40 opposite the edge portion which clamps the safety belt against the base plate retaining section 36. The length 72 of the safety belt extends from the portion 62 past the area where it is clamped against the retaining section 36 by the lock bar 40 and across the lap of an occupant of a vehicle to the fixed connection 19 (FIG. 1) with the vehicle. Similarly, the section 68 of the safety belt 16 extends upwardly across the torso of an occupant of a vehicle to the retractor assembly 18. The safety belt portion 72 when tensioned pulls the portion 62 of the safety belt against the lock bar 40 to clamp the safety belt firmly between the lock bar 40 and the retaining section 36.

When the latch bar 40 is in the engaged position of FIG. 3 the safety belt 16 is turned around the edge portion 64 of the locking bar and pulled snug around the lap and torso of an occupant of a vehicle. The safety belt is turned back around the lock bar 40 (FIG. 3) between the flanges 44 and 46. The safety belt does not extend through an opening in the base plate 32. The safety belt 16 is located on the same side, that is the flange side, of the base plate 32 at all times.

The tongue plate 52 extends at an acute angle to the main section 34 of the base plate 32. This is optional. The tongue plate 52 could be parallel to the main section 34 of the base plate 32. However, the tongue plate 52 extends at the acute angle to the main section 34 of the base plate 32 so that the tongue assembly 14, when locked in the buckle, conforms somewhat to the curvature of the belt around the lap of the occupant.

In the embodiment of the invention illustrated in FIGS. 2-5, the safety belt 16 is clamped between the retaining portion 36 of the base plate 32 and the lock bar 40. In the embodiment of the invention illustrated in FIGS. 6 and 7, a safety belt is clamped between a lock bar and a flange retainer or spreader bar extending between flanges on opposite sides of the base structure. Since the embodiment of the invention illustrated in FIGS. 6 and 7 is generally similar to the embodiment of the invention illustrated in FIGS. 2-5, similar numerals will be utilized to designate similar components, the suffix letter "a" being associated with the numerals of FIGS. 6 and 7 to avoid confusion.

The tongue assembly 14a of FIG. 6 includes a base structure 28a having a base plate 32a. A flange 44a extends perpendicular to the base plate 32a. Although only the flange 44a is shown in FIGS. 6 and 7, it should be understood that a second flange, corresponding to the flange 46 of FIG. 4, extends parallel to the flange 44a. A lock bar 40a has an end portion which engages a slot 42a formed in the flange 44a. The opposite end of the lock bar 40a engages a slot formed in the opposite flange.

When the tongue assembly 14a is in the inactive position of FIG. 6, the safety belt 16a extends straight through the tongue assembly 14a. This allows the tongue assembly 14a to fall downwardly along the safety belt 16a under the influence of gravity or allows the belt to move freely relative to the tongue assembly 14a due to the force of the retractor acting on the belt. Therefore, the safety belt 16a can be withdrawn into a retractor assembly (not shown) without pulling the safety belt 16a with sufficient force to move the tongue assembly 14a. The relatively low force required to retract the safety belt 16a permits a reduction in the pressure against the torso of an occupant of a vehicle when the tongue assembly 14a is engaged with a buckle.

When the tongue assembly 14a is to be connected with a buckle, corresponding to the buckle of FIG. 1, the tongue assembly is pulled along the safety belt 16a and moved to the position of FIG. 7. As a tongue plate 52a is inserted into the buckle, a latch in the buckle is positioned in an opening 56a in the tongue plate to hold the tongue assembly 14a against movement relative to the buckle. Once this has been done, a portion 68a of the safety belt 16a will extend across the lap of an occupant of a vehicle. A second portion 72a of the safety belt will extend across the torso of the occupant of the vehicle. The latch bar 40a will be pulled upwardly toward a combination spreader bar and retaining plate 76 by a belt portion 62a exposed between the two sections 68a and 72a of the safety belt 16a. Thus, the belt portion 62a applies force against the end portion 64a of the lock bar 40a to press the end portion 60a of the lock bar toward the retainer plate 76. This results in the safety belt 16a being firmly clamped between the end portion 60a of the lock bar 40a and the retainer plate 76.

In the embodiment of the invention illustrated in FIGS. 6 and 7, the safety belt 16a extends through a rectangular opening 82 formed in the base plate 32a. When the tongue assembly 14a is in the position of FIG. 6, the straight safety belt 16a extends through a portion of a rectangular opening 82 disposed adjacent to the tongue plate 52a. When the tongue assembly 14a is in the position of FIG. 7, the safety belt 16a extends through a portion of the opening 82 disposed adjacent to the base plate 32a.

From the above description of a preferred embodiment of the present invention, those skilled in the art will perceive improvements, changes and modifications in the invention. Such improvements, changes and modifications within the skill of the art are intended to be covered by the appended claims.

Having described the invention, I claim:

1. A safety apparatus for use in restraining an occupant of a vehicle in a vehicle seat against movement relative to the vehicle seat, said safety apparatus comprising:
    a belt for restraining the occupant of the vehicle in the vehicle seat, said belt having a first portion extendable across the lap of the occupant of the vehicle and a second portion extendable across the torso of the occupant of the vehicle, said belt being located on one side of the vehicle seat when not restraining the occupant of the vehicle;
    a buckle to be secured adjacent to the other side of the vehicle seat; and
    a tongue assembly slidably mounted on said belt and connectable with said buckle to secure the first portion of the belt across the lap of the occupant of the vehicle and to secure the second portion of the belt across the torso of the occupant of the vehicle, said tongue assembly including:
        a base comprising a base plate, spaced facing flanges extending from said base plate, and a belt clamp portion located between said flanges;
        said spaced flanges defining a first opening through which said belt enters said tongue assembly in a direction generally parallel to said base plate and a second opening through which said belt extends when not restraining the occupant of the vehicle; and
        a lock bar having a belt locking portion located between said spaced flanges and slidable relative to said base plate between a first belt clamping position in which said belt is clamped between said belt clamp portion and said belt locking portion of said lock bar and a second non-clamping position in which said belt extends through said tongue assembly and said first and second openings along a substantially linear path to allow said tongue assembly to freely slide along said belt;
        each of said spaced flanges having a longitudinally extending slot for receiving an end of said lock bar and for supporting said lock bar for sliding movement along said longitudinally extending slots between said first belt clamping and second non-clamping positions.

2. A safety apparatus as defined in claim 1 wherein said belt clamp portion comprises a retainer connected to said flanges, extending between said flanges and spaced from said base plate, said retainer further defining said first opening.

3. A safety apparatus as set forth in claim 2 wherein said base plate has a third opening therein through which one portion of said belt extends when said tongue assembly is connected with said buckle.

4. A safety apparatus for use in restraining an occupant of a vehicle in a vehicle seat against movement relative to the vehicle seat, said safety apparatus comprising:
    a belt for restraining the occupant of the vehicle in the vehicle seat, said belt having a first portion extendable across the lap of the occupant of the vehicle and a second portion extendable across the torso of the occupant of the vehicle, said belt being located on one side of the vehicle seat when not restraining the occupant of the vehicle;
    a buckle to be secured adjacent to the other side of the vehicle seat; and
    a tongue assembly slidably mounted on said belt and connectable with said buckle to secure the first portion of the belt across the lap of the occupant of the vehicle and to secure the second portion of the belt across the torso of the occupant of the vehicle, said tongue assembly including:
        a base comprising a base plate having an inner surface, spaced facing flanges extending from said inner surface of said base plate, and a belt clamp portion projecting from said inner surface of said base into the area between said spaced flanges;
        said spaced flanges defining a first opening through which said belt enters said tongue assembly in a direction substantially parallel to said base plate and adjacent thereto, and a second opening through which said belt extends when not restraining the occupant of the vehicle; and
        a lock bar having a belt clamping portion located between said spaced flanges and slidable relative to said inner surface of said base plate between a first belt clamping position in which said belt is clamped between said belt clamp portion and said belt clamping portion of said lock bar, and a second non-clamping position in which said belt extends through said tongue assembly and said first and second openings along a substantially linear path to allow said tongue assembly to freely slide along said belt;
        each of said spaced flanges having a longitudinally extending slot for receiving an end of said lock bar and for supporting said lock bar for sliding movement along said longitudinally extending slots between said first belt clamping and second non-clamping positions;
        said first and second portions of said belt extending through said first opening when said tongue assembly is connected to said buckle.

5. A safety apparatus for use in restraining an occupant of a vehicle in a vehicle seat against movement relative to the vehicle seat, said safety apparatus comprising:
    a belt for restraining the occupant of the vehicle in the vehicle seat, said belt having a first portion extendable across the lap of the occupant of the vehicle and a second portion extendable across the torso of the occupant of the vehicle, said belt being located on one side of the vehicle seat when not restraining the occupant of the vehicle;

a buckle to be secured adjacent to the other side of the vehicle seat; and a tongue assembly slidably mounted on said belt and connectable with said buckle to secure the first portion of the belt across the lap of the occupant of the vehicle and to secure the second portion of the belt across the torso of the occupant of the vehicle, said tongue assembly including:

a base comprising a base plate, spaced facing flanges extending from said base plate, and a retainer connected to said spaced flanges and extending between said spaced flanges in spaced relationship to said base plate;

said spaced flanges and said retainer defining a first opening through which said belt enters said tongue assembly in a direction generally parallel to said base plate and adjacent to said retainer, and said spaced flanges defining a second opening through which said belt extends when not restraining the occupant of the vehicle; and a lock bar having a belt clamping portion located between said spaced flanges and slidable relative to said base plate between a first belt locking position in which said belt is clamped between said retainer and said belt locking portion of said lock bar, and a second non-locking position in which said belt extends through said tongue assembly and said first and second openings along a substantially linear path to allow said tongue assembly to freely slide along said belt;

each of said spaced flanges having a longitudinally extending slot for receiving an end of said lock bar and for supporting said lock bar for sliding movement along said longitudinally extending slots between said first belt clamping and second non-clamping positions.

6. A safety apparatus as set forth in claim 5 wherein said base plate has a third opening through which one portion of said belt extends when said tongue assembly is connected to said buckle.

7. A safety apparatus for use in restraining an occupant of a vehicle in a vehicle seat against movement relative to the vehicle seat, said safety apparatus comprising:

a belt for restraining the occupant of the vehicle in the vehicle seat, said belt having a first portion extendable across the lap of the occupant of the vehicle and a second portion extendable across the torso of the occupant of the vehicle, said belt having a restraining position in which said first and second portions of said belt extend across the lap and torso of the occupant of the vehicle, respectively, and a nonrestraining position, in which said belt is located on one side of the vehicle seat;

a buckle to be secured adjacent to the other side of the vehicle seat; and a tongue assembly connectable with said buckle to secure the first portion of the belt across the lap of the occupant of the vehicle and to secure the second portion of the belt across the torso of the occupant of the vehicle, said tongue assembly including:

a base comprising a base plate, spaced facing flanges extending from said base plate, and a belt clamp portion extending from said base plate transverse to said flanges and in the same direction as said spaced facing flanges extend from the base plate;

said spaced flanges defining an opening through which said belt extends in the nonrestraining position thereof; and a lock bar having a belt locking portion located between said spaced flanges, said lock bar being slidable relative to said base plate between a first belt clamping position in which said belt is clamped between said belt clamp portion and said belt locking portion of said lock bar and a second non-clamping position in which said tongue assembly is freely slidable along said belt and said belt extends through said tongue assembly and said opening;

each of said spaced flanges having a longitudinal slot extending at an acute angle to said base plate for receiving an end of said lock bar and for supporting said lock bar for sliding movement along said longitudinal slots between said first belt clamping and second non-clamping positions;

said belt engaging a portion of said lock bar being longitudinally spaced from said belt locking portion upon being moved from the nonrestraining position of said belt to the restraining position of said belt to move said lock bar along said longitudinal slots from the nonclamping position of said lock bar to the clamping position of said lock bar.

8. A safety apparatus as set forth in claim 7 wherein each of said slots has a longitudinal axis intersecting said belt clamp portion of said base.

9. A safety apparatus for use in restraining an occupant of a vehicle in a vehicle seat against movement relative to the vehicle seat, said safety apparatus comprising:

a belt for restraining the occupant of the vehicle in the vehicle seat, said belt having a first portion extendable across the lap of the occupant of the vehicle and a second portion extendable across the torso of the occupant of the vehicle, said belt being located on one side of the vehicle seat when not restraining the occupant of the vehicle;

a buckle to be secured adjacent to the other side of the vehicle seat; and a tongue assembly slidably mounted on said belt and connectable with said buckle to secure the first portion of the belt across the lap of the occupant of the vehicle and to secure the second portion of the belt across the torso of the occupant of the vehicle, said tongue assembly including:

a base comprising a base plate, spaced facing flanges extending from said base plate, and a belt clamp portion located between said flanges;

said spaced flanges defining a first opening through which said belt enters said tongue assembly in a direction generally parallel to said base plate and a second opening through which said belt extends when not restraining the occupant of the vehicle; and a lock bar having a belt locking portion located between said spaced flanges and slidable relative to said base plate between a first belt clamping position in which said belt is clamped between said belt clamp portion and said belt locking portion of said lock bar and a second non-clamping position in which said belt extends through said tongue assembly and said first and second openings along a substantially linear path to allow said tongue assembly to freely slide along said belt;

each of said spaced flanges having a longitudinally extending slot for receiving an end of said lock bar and for supporting said lock bar for sliding movement along said longitudinally extending slots between said first belt clamping and second non-clamping positions; said tongue assembly comprising a tongue connected to said base plate and projecting therefrom for connection with said buckle, said tongue extending at an acute angle from said base plate and having a tip portion spaced from said second opening and said tip portion engaging said belt and riding thereon when said tongue assembly slides along said belt.

10. A safety apparatus as defined in claim 9 wherein said belt clamp portion comprises a projection extending from said base plate into the area between said spaced flanges.

11. A safety apparatus for use in restraining an occupant of a vehicle in a vehicle seat against movement relative to the vehicle seat, said safety apparatus comprising:

a belt for restraining the occupant of the vehicle in the vehicle seat, said belt having a first portion extendable across the lap of the occupant of the vehicle and a second portion extendable across the torso of the occupant of the vehicle, said belt being located on one side of the vehicle seat when not restraining the occupant of the vehicle;

a buckle to be secured adjacent to the other side of the vehicle seat; and a tongue assembly slidably mounted on said belt and connectable with said buckle to secure the first portion of the belt across the lap of the occupant of the vehicle and to secure the second portion of the belt across the torso of the occupant of the vehicle, said tongue assembly including:

a base comprising a base plate, spaced facing flanges extending from said base plate, and a retainer connected to said spaced flanges and extending between said spaced flanges in spaced relationship to said base plate;

said spaced flanges and said retainer defining a first opening through which said belt enters said tongue assembly in a direction generally parallel to said base plate and adjacent to said retainer, and said spaced flanges defining a second opening through which said belt extends when not restraining the occupant of the vehicle; and a lock bar having a belt clamping portion located between said spaced flanges and slidable relative to said base plate between a first belt locking position in which said belt is clamped between said retainer and said belt locking portion of said lock bar, and a second non-locking position in which said belt extends through said tongue assembly and said first and second openings along a substantially linear path to allow said tongue assembly to freely slide along said belt;

each of said spaced flanges having a longitudinally extending slot for receiving an end of said lock bar and for supporting said lock bar for sliding movement along said longitudinally extending slots between said first belt clamping and second non-clamping positions;

said base plate having a third opening through which one portion of said belt extends when said tongue assembly is connected to said buckle; and said base plate having a first portion from which said spaced flanges extend, and a second portion extending at an acute angle to said first portion, said third opening being formed in said first and second portions, and said tongue assembly comprising a tongue connected to said second portion of said base plate and projecting therefrom substantially parallel to said first portion for connection with said buckle, said belt extending through said third opening and substantially parallel to said tongue when not restraining the occupant of the vehicle.

* * * * *